Figure 1:
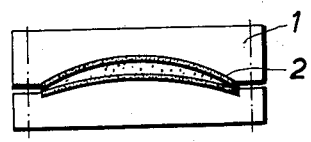

March 8, 1960  P. HOPPE ET AL  2,927,876
ARTICLE COMPRISING A CELLULAR CORE AND SHEATH
Filed July 26, 1955

SECTION a-b

SECTION c-d

INVENTORS:
PETER HOPPE, HANS-WILLI PAFFRATH
BY Elmer P. Rucker

ATTORNEY

United States Patent Office 2,927,876
Patented Mar. 8, 1960

2,927,876

ARTICLE COMPRISING A CELLULAR CORE AND SHEATH

Peter Hoppe, Troisdorf, and Hans-Willi Paffrath, Koln-Deutz, Germany, assignors, by direct and mesne assignments, of one-half to Farbenfabriken Bayer Aktiengesellschaft, Leverkusen, Germany, and one-half to Mobay Chemical Company, Pittsburgh, Pa., a corporation of Delaware Application July 26, 1955, Serial No. 524,358

Claims priority, application Germany July 30, 1954

2 Claims. (Cl. 154—54)

This invention relates to improved shaped articles of polyurethane foam.

It is well known that articles having a very smooth and impervious surface are produced when using highly polished molds for making shaped bodies or elements of elastic or rigid polyurethane foams. Shaped articles having a glossy, impervious surface are also obtained when resilient molds of rubber, polyvinyl chloride or polyvinyl chloride-gelatine masses are used in the production of polyurethane foams. In many cases, however, and especially in the manufacture of bodies of elastic polyurethane foam which are used for upholstery purposes, it is necessary to avoid such smooth, impervious surfaces in order to allow breathing of the bodies.

It is an object of the present invention to provide shaped articles of plastic foam having a porous surface. Another object is to provide a process for producing shaped articles of plastic foam having a surface with good breathing properties.

These and still further objects will become apparent from the following description read in conjunction with the drawings.

It has now been found that shaped articles of plastic foam having a porous surface with excellent breathing properties can be produced if the molds into which the foamable mixture is introduced are lined with thin foils of a foamed polyurethane. The foamable mixture may be e.g. a foamable polyester-polyisocyanate or a foamable polyvinyl chloride mixture.

The foils with which the inside of the molds is clad according to the present invention may be made from any suitable foamed plastic. According to a preferred embodiment of the invention, the foils are made from elastic polyurethane foam having a bulk density of less than 50 kg./m.$^3$. Although foils of any suitable dimensions may be used, it is preferred to employ foils which are 1 to 2 mm. thick and have pores with a diameter of 1 to 2 mm. The foils can be cut out from any block of elastic polyurethane foam having the above characteristics (bulk density, pore size).

Even molds having an irregular shape can be lined with such foils to carry out the process of the invention since the foils can be adapted to any contour. In some cases it may be advantageous to use a preliminary heating process to facilitate the adaptation of the foils to the inside of the mold.

The mold is brushed with a parting compound, such as waxes or waxy emulsions and clad with the appropriately cut foil. The lined mold is then filled with a foamable e.g. polyester-polyisocyanate mixture. Although this mixture may be prepared in any suitable manner, it has proven particularly advantageous to use the process and apparatus described and claimed in copending U.S. application Serial No. 327,522, filed December 23, 1952, now abandoned, and assigned to the same assignee as the present case. In accordance with the process of this application, a polyester, a polyisocyanate, and an activator mixture are brought together in an enclosed mixer, at least the activator mixture being injected at a pressure substantially higher than that in said mixer, and the resulting liquid mixture is then discharged from the mixer into a mold. In the mold, a solid polyurethane foam is formed due to a plurality of chemical reactions, which involve evolution of carbon dioxide, polyaddition of polyester and polyisocyanate molecules, and cross-linking between polyurethane chains.

Although any foamable polyester-polyisocyanate mixture may be used for filling the lined molds, it is preferred to employ quickly expanding mixtures which rise in a thinly liquid form, and which readily penetrate into the still open pores of the lining foils and may extend as far as the walls of the mold. The same applies to the use of a foamable polyvinyl chloride mixture.

When producing moldings of elastic foams in accordance with the invention, it is preferred to employ molds with permeable walls such as perforated metal molds and screens which greatly facilitate the release of gas from the hardening foam material through the foils. By this means, the formation of blow holes in the core of the foam material is completely avoided.

When manufacturing seat cushions of relatively large dimensions, for example automobile seat cushions, the bottom of the mold is advantageously lined with paper so that the liquid reaction mixture is not able to pass through while the sides and cover of the mold are lined with the elastic foamed foils as indicated above. About 5 minutes after the foaming process has taken place, the mold is emptied and the paper is detached from the bottom of the molding.

Figure 2:
Figure 3:
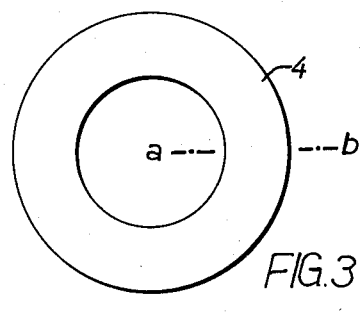
Figure 4:
Figure 5:
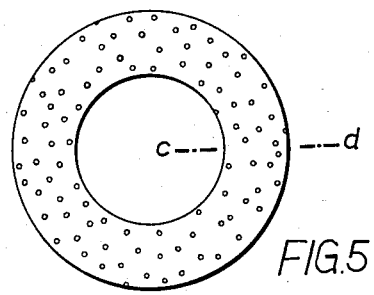
Figure 6:
Figure 7:
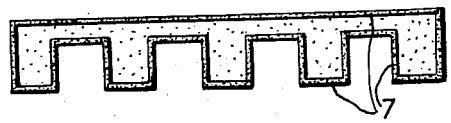

The invention will now further be described with reference to the accompanying drawings, in which: Figure 1 shows a mold which is lined internally with the foamed foils 2 and into which the mixture of elastic foamable materials is introduced. Figure 2 shows the finished molded body consisting of the foamed foils 2 and the blown core 3. The molded body which is shown in Figure 3 is a lifebelt 4. Figure 4 shows a section taken on the line a—b of Figure 3 and shows the consolidated marginal zone 5 and the foamed core 6. The lifebelt may be produced in an apertured mold shown in Figure 5, the cross-section of which on the lines a—b is shown in Figure 6. It is also possible to produce molded bodies with recesses such as the mattress shown by way of example in Figure 7. In this case, the mold is completely lined internally with elastic foamed foils 7, so that an elastic body is formed which is completely encased with the elastic foamed foils.

During the manufacture of the article of this invention the air present during the foaming process in the closed molds may be satisfactorily displaced through the lining foils. When shaped articles are produced from rigid polyurethane foam, a substantial increase in the strength of the marginal zone is obtained and the bulk density of said marginal zone may rise to 200 to 250 kg./m.$^3$.

The types of articles made from a yielding elastic foam, include seat cushions, paddings for arm chairs, mattresses, carpet underlayers, bath mats, dolls, and toys. Furthermore, articles made from a rigid foam, include lifebelts, floats, parts of furniture, artificial limbs, display figures, objects d'art, and the like.

Foamable polyester-polyisocyanate or polyvinyl chloride mixtures which are suitable for producing the article of the invention are described in the following examples, but it is to be understood that these examples are given by way of illustration and not of limitation. All parts are given by weight.

Example 1

A foil is cut from a block of foamed polyurethane with a bulk density of 50 kg./m$^3$. The block is prepared from the following mixture:

100 parts of a polyester prepared from 27 mols of adipic acid, 27 mols of ethylene glycol and 1 mol of trimethylol propane by thermal condensation at 200°–220° C. (OH number 60–65, acid number 1–2),
36 parts of toluylene diisocyanate, and
8 parts of the following activator mixture: 3 parts of bis-(diethylaminoethanol)-adipate, 1 part of diethylamine oleate, 1.5 parts of a sulfonated castor oil, 1 part of water, and 0.4 part of paraffin oil.

The mold is brushed with a wax and then clad with the aforementioned foil (1.5 mm. in thickness). The following foamable mixture is hereafter introduced into the lined mold, a hard foamed body being produced thereby:

80 parts of a polyester with the hydroxyl number 270–290 and the acid number 1.0–4.0, which is produced by thermal condensation at 180–200° C. from 2.5 mols of adipic acid, 0.5 mol of phthalic acid and 4 mols of hexanetriol, and also
20 parts of a polyester with the hydroxyl number 215–230 and the acid number 1.5–3.0, which is produced by thermal condensation at 180–200° C. from 3 mols of adipic acid, 2 mols of 1,3-butylene glycol and 2 mols of trimethylol propane, are mixed with
60 parts of a technical mixture of 1,2,4-toluylene diisocyanate and 1,2,6-toluylene diisocyanate.

This mixture then has added to it:

9 parts of an activator mixture of 3 parts of bis-(diethylaminoethanol)-adipate, 2 parts of diethylamine oleate and 4 parts of a sulfonated castor oil with a water content of 54%.

Example 2

Another suitable mixture to be introduced into the mold lined according to Example 1 is prepared as follows:

100 parts of a hydroxyl polyester of 10 mols of adipic acid, 10 mols of ethylene glycol and 0.3 mol of trimethylol propane, which is obtained by thermal condensation at 200–215° C., are mixed with
37 parts of toluylene diisocyanate.

This mixture has added to it:

9.2 parts of an activator mixture of 3 parts of hexahydrodimethyl aniline, 1 part of diethylamine oleate, 1.5 parts of sulfonated castor oil containing 54% of water, 0.2 part of paraffin oil and 1.5 parts of water.

Example 3

In order to produce an elastic foamed plastic a quick-blowing mixture which is prepared as described hereinafter is introduced into the mold lined with a foil according to Example 1:

100 parts of a polyester of 27 mols of adipic acid, 27 mols of diethylene glycol and 1 mol of trimethylol propane with the acid number 1.0–1.5 and the hydroxyl number 60–63, which is obtained by thermal condensation at 200–215° C., are mixed with
45 parts of a technical mixture of 1,2,4-toluylene diisocyanate and 1,2,6-toluylene diisocyanate.

The mixture has added to it:

10–12 parts of an activator mixture of 3 parts of bis-(diethylaminoethanol)-adipate, 1 part of diethylamine oleate, 2 parts of water and 3 parts of a sulfonated castor oil containing 54% of water.

Example 4

50 parts of polyvinyl chloride,
50 parts of dioctyl phthalate, and
15 parts of ammonium carbonate are filled into an autoclave and heated to 80° C. The blowing mixture is then sprayed into molds lined with a foamed polyurethane foil according to Example 1. The mold is then finally heated to 150° C. to complete reaction.

In the above examples, a mixture of 1,2,4-toluylene diisocyanate and 1,2,6-toluylene diisocyanate is used for convenience as the polyisocyanate reactant, but any organic polyisocyanate may be used in its place, including 1,4-phenylene diisocyanate, 1,5-naphthylene diisocyanate, triphenyl methane-4,4',4"-triisocyanate, diphenyl methane-4,4'-diisocyanate and dimethyl diphenyl-4,4'-diisocyanate.

The polyesters suitable for the production of the polyurethane foam are prepared in known manner from polyhydric alcohols and polycarboxylic acids using such proportions of the reactants as to produce polyesters having a hydroxyl number of 80 to 450 and an acid number of 0 to 10.

A large number of polyhydric alcohols may be used for preparing the polyesters, as for instance, ethylene glycol, diethylene glycol, polyethylene glycol, 1,2-propylene glycol, 1,3-butylene glycol, 1,4-butylene glycol, 1,6-hexanediol, trimethylol ethane, trimethylol propane, glycerol, hexanetriol, and pentaerythritol.

Among the polycarboxylic acids which may be esterified with the polyhydric alcohols to form suitable polyesters are adipic acid, phthalic acid, and succinic acid.

In the foaming process, generally 0.5 to 1.5 mols of diisocyanate are used for each gram equivalent of hydroxyl groups contained in the polyester. The activator mixture contains the amount of water (0.5–10%) usually necessary for the foaming process, an emulsifier (0.5–10%) and an accelerator, such as a tertiary amine (0.1–4%).

While certain representative embodiments and details have been shown for the purpose of illustrating this invention, it will be apparent to those skilled in the art that various changes and modifications may be made therein without departing from the spirit and scope of the invention.

We claim:

1. A shaped article of plastic foam having improved breathing characteristics comprising a core of porous plastic foam and a surface skin of plastic foam having pores extending therethrough, said core having protuberances that extend into some of the pores of the skin, thereby locking the skin to the core.

2. A shaped body of elastic polyurethane foam adapted for upholstery and having improved breathing characteristics comprising a core of cured porous polyurethane plastic foam and a surface skin of polyurethane plastic foam having pores extending therethrough, said core having protuberances that extend into some of the pores of the skin, thereby locking the skin to the core.

References Cited in the file of this patent

UNITED STATES PATENTS

| Number | Name | Date |
|---|---|---|
| 2,320,425 | Glaes et al. | June 1, 1943 |
| 2,357,513 | Harmon | Sept. 5, 1944 |
| 2,639,252 | Simon et al. | May 19, 1953 |
| 2,681,321 | Stastny | June 15, 1954 |
| 2,706,311 | Durst | Apr. 19, 1955 |
| 2,780,350 | Simon et al. | Feb. 5, 1957 |